(No Model.)　　　　　T. B. JEFFERY.　　　2 Sheets—Sheet 1.
WHEEL TIRE.

No. 466,565.　　　　　　　　Patented Jan. 5, 1892.

WITNESSES.　　　　　　　　　　　　INVENTOR
J. L. Timison　　　　　　　　　　　Thos. B. Jeffery
Jean Elliott　　　　　　　　　　　By Burton & Burton
　　　　　　　　　　　　　　　　　　attys.

(No Model.)  2 Sheets—Sheet 2.
T. B. JEFFERY.
WHEEL TIRE.
No. 466,565. Patented Jan. 5, 1892.
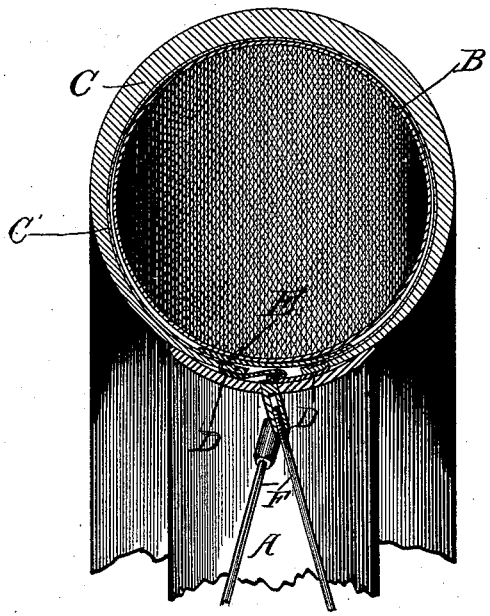
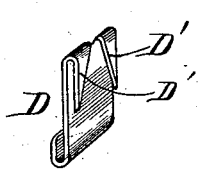
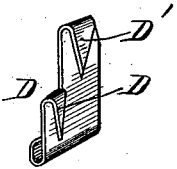
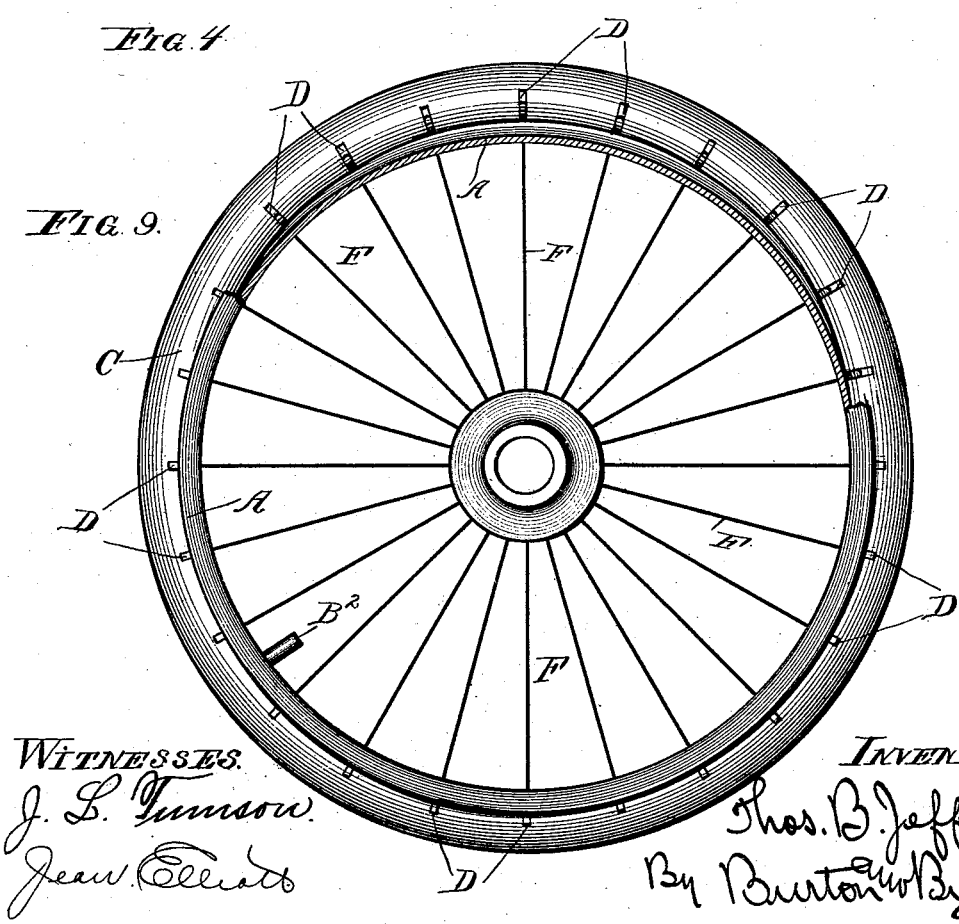
WITNESSES.  
J. L. Timson  
Jean Elliott
INVENTOR  
Thos. B. Jeffery  
By Burton and Burton  
attys

UNITED STATES PATENT OFFICE.

THOMAS B. JEFFERY, OF CHICAGO, ILLINOIS.

WHEEL-TIRE.

SPECIFICATION forming part of Letters Patent No. 466,565, dated January 5, 1892.

Application filed June 11, 1891. Serial No. 395,845. (No model.)

*To all whom it may concern:*

Be it known that I, THOMAS B. JEFFERY, a citizen of the United States, residing at Chicago, county of Cook, and State of Illinois, have invented certain new and useful Improvements in Wheel-Tires, which are fully set forth in the following specification, reference being had to the accompanying drawings, forming a part thereof.
This invention relates to the construction of elastic tires for vehicle-wheels, and particularly to tires which comprise an inflatable inner tube or core, which is retained within a protecting-sheath, which forms the tread of the wheel. It comprises two leading features: first, the construction of the tire in a complete seamless annulus or endless band, as distinguished from one made from a straight piece of tubing folded to bring its ends together and having the ends joined, as is the more common construction; second, the fastenings by which such tire or sheath for the tire is secured to the wheel-rim.

Figure 1:
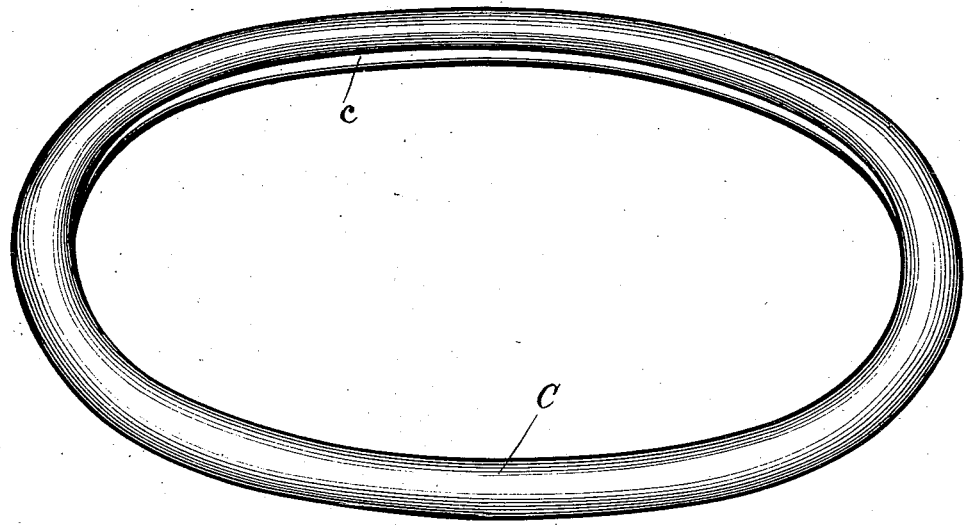
Figures 2, 3:
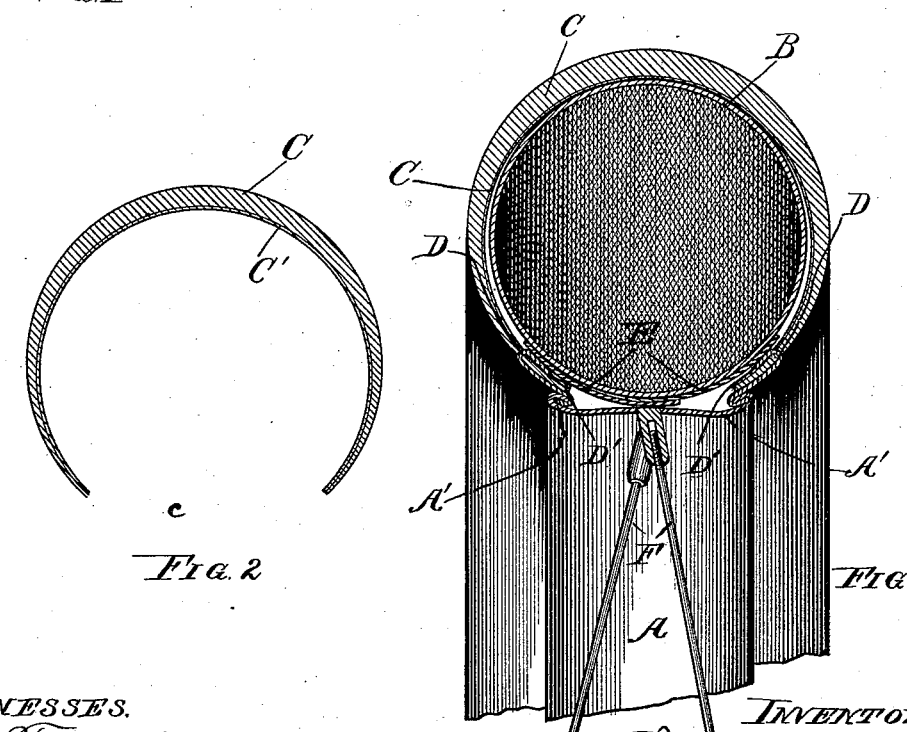

In the drawings, Figure 1 represents the complete annulus of rubber or similar substance, which can be molded into the form designed for the sheath for an inflatable tire-core. Fig. 2 is a transverse section of such annulus. Fig. 3 is a transverse section of a complete tire and the tire-rim upon which it is placed, showing the mode of fastening the sheath to the wheel-rim. Fig. 4 is a similar section showing the tire, both core and sheath complete and seated in the wheel-rim, the figure representing the edges of the rift joined by reciprocal hooks engaging with each other instead of with the edges of the rim, the intention being to represent this tire as secured in the rim by the usual method of cementing it thereto. Figs. 5, 6, 7, and 8 are perspective views of several forms of hooks which may be employed in my invention. Fig. 9 is a side elevation of a wheel having my invention applied to it, the tire being shown partly attached and partly unattached to illustrate the compression of the tire in the process of attaching it.

A is the wheel-rim.
B is the inflatable core of the tire.
C is the outer tube or sheath of the tire, which, as illustrated, forms also the tread.

This invention has to do chiefly with the part C and its connection to the rim, the inflatable core being of any desired construction and material adapted for its purpose. I form the outer sheath C by molding it in an annular mold, preferably making it with an inner lining of textile fabric C' by methods which belong to the art of rubber manufacture. This specific feature of construction is not a part of the present invention. After the sheath is thus molded it is split open at the inner side throughout its entire circumference, the rift c being thus made to permit the core B to be inserted.

The severed edges of the annular sheath may be joined together directly by metal hooks D D, the construction of which may be varied considerably, the essential feature being that they are provided with tangs or spurs D' D' at one end, adapted to be inserted through the substance of the annular sheath C near the edges of the rift and clinched down upon said substance, and have at the other end hooks adapted to be mutually engaged or to engage with the margin of the rim A, which will in that case be provided with a suitable reversed flanged or hooked edge A' for such purpose. The hooks D may be made of sheet metal or wire in any of the forms illustrated, that in Fig. 5 having two tangs D' D' side by side to engage the substance of the sheath C, that in Fig. 6 having two tangs, one of which is back of the other to adapt it to take hold of the fabric of the sheath farther back from the edge, that in Fig. 7 being made of wire, the ends of which form the tangs and the middle part of which is folded to form the hook D² to engage the rim.

In Fig. 8 are shown two hooks reciprocal in form at their mutual and engaging ends and similar in form at the ends which engage the sheath for the obvious reason of permitting them mutually to engage each other, instead of similarly engaging the rim. When this form of construction is employed, the completed tire, with the sheath thus bound upon it by the mutually-engaged hooks, may be secured to the rim in the customary manner by cementing it thereto.

In order to prevent the danger of wearing the inner inflated tube by the friction of the points of the tangs D' thereupon, I employ the flaps E E, of canvas, which I attach to the inner surface of the sheath just back of the line at which the tangs will protrude, and in seating the tire in the rim this flap covers the tangs, and may also extend down past the middle of the rim and cover the headed ends of the spokes F, which tend also somewhat to abrade the core. Obviously the two flaps may be made as one—that is, one flap may be wide enough to extend entirely across the interval between the two edges of the sheath and protect the core from the tangs of the hooks on the edge opposite that at which it is attached. This modification is not material.

It has been customary in the construction of elastic tires for wheels to make them somewhat smaller than the rim of the wheel to which they were to be applied, so they would have to be stretched onto the wheel, the theory and intention being that thereby they were more securely held in place; but this mode of construction stretches the periphery and makes them especially liable to damage from sharp stones or even from ordinary wear in use, because every abrasion or cut tends to gap open. In making my sheath or tire, therefore, in the form of a seamless endless belt I overcome this defect by making the tire or sheath always a little larger than the wheel to which it is to be applied, so that, instead of being stretched on, as has heretofore been customary, and thereby receiving an initial tension causing it to gap, it is bound onto the wheel and thereby compressed instead of stretched. Of course the difference between the two diameters will be a matter of judgment and will not be made so much as to cause any puckering of the tire in forcing it down to the lesser diameter of the wheel; but a very little excess of the diameter of the tire over that of the wheel will produce the compression which I wish to substitute for the tension which it has heretofore obtained. I am able to secure the tire, notwithstanding it is thus compressed, by means of the hook-fastenings which I employ, which bind it positively at numerous points throughout its circumference, and I place the hooks so near together that the tire is practically compressed uniformly all around its circumference when it is thus bound into place upon the wheel-rim. This feature of construction may be best understood from examination of Fig. 9, wherein the difference between the diameter of the wheel and the diameter of the tire is somewhat exaggerated at the portion which shows the tire unsecured.

The order of assembling the parts of my improved tire upon the wheel-rim will be understood to be that, after the sheath has been molded and the inner rift made and the protecting canvas flaps E attached, the inflatable core is introduced into the sheath through such rift, the hooks being made fast into the edges of the rift either before or after introducing the core, and the tire, including the sheath and core, is placed upon the rim and the hooks engaged with the hooked flange of the rim throughout the entire circumference on both sides, this engagement being easily effected while the core is in a collapsed or non-inflated condition. The core being then inflated through the usual inflating-nipple $B^2$, will cause it to fill the cavity of the sheath and will cause the hooks D to be drawn tightly into engagement with the flanges of the rim, thus completely securing the tire in place.

When it is desired to obtain access to the core for the purpose of any repairs which may be deemed necessary, the air being allowed to escape therefrom, any hook D may be easily detached from the rim and access obtained to the core at any point without entirely removing the sheath or disorganizing the tire, and when the necessary repair is made the hook or hooks thus disengaged are readily re-engaged and the core inflated, again rendering the fastening of the tire to the wheel perfectly secure.

I claim—

1. In combination with the rim, an elastic tire of greater length than the tire-seat of the rim, said rim and tire being laterally hooked and thereby mutually engageable, whereby the tire, being compressed until it seats in the rim, may be engaged positively therewith and held in a compressed condition thereon, substantially as set forth.

2. A tire for vehicle-wheels, comprising, in combination with the rim, a tubular ring, the inner circumference of the tire being greater than the circumference of the tire-seat in the rim, the lateral edges of the rim being hooked and the tire being suitably provided with means for engaging said hooked edges, whereby, the tire being compressed to its seat in the rim, said parts may be mutually engaged to hold the tire onto the rim in a compressed condition, substantially as set forth.

3. In a wheel, in combination with the rim, the inflatable core seated therein and the sheath covering and restraining said inflatable core, rigid fastenings having suitable spurs or tangs by which they are secured to the lateral edges of such sheath, and hooked ends to engage the rim, such rim having a reversed or hooked edge to be engaged by such hooks, substantially as set forth.

4. In combination with the inflatable core, a seamless endless ring forming a sheath for such core, metallic hooks secured to the lateral edges of such endless sheath, having their free ends hooked, whereby they are adapted to bind the sheath about the core, substantially as set forth.

5. In a wheel, in combination with the rim, an elastic tire of greater dimension than the rim, and detachable fastenings distributed throughout the circumference of such tire and connected to the rim, whereby it is held compressed to the rim, substantially as set forth.

6. The method or process of manufacturing and securing to wheels inflated tires, which consists in making an endless tubular ring or hollow annulus to form a sheath rifted circumferentially at the inner side, inserting the inflatable core through the rift into the cavity of such sheath, applying such tire comprising the sheath and core to the wheel-rim, connecting the sheath to the rim by hooks on opposite sides of the rift through which the core was introduced, and then inflating the core to cause it to fill the sheath and bring the hooks into complete engagement, substantially as set forth.

7. The metallic rim of the wheel and the endless seamless tire-sheath of rubber or like cushioning substance circumferentially rifted at the inner side and joined to both edges of the rim, which thereby spans and covers such rift, combined with the inflatable core within the cavity of the sheath, removable and insertible through the rift, substantially as set forth.

8. In a wheel, in combination with the rim, the core-sheath and the hooks provided with tangs by which they are secured to the lateral edges of such sheath, the inflatable core within the sheath, and the protecting-flaps E, cemented to the inner surface of the sheath back of the hooks and extending between the tangs of the same and the core to protect the latter, substantially as set forth.

In testimony whereof I have hereunto set my hand, in the presence of two witnesses, at Chicago, Illinois, this 9th day of June, 1891.

THOS. B. JEFFERY.

Witnesses:
 CHAS. S. BURTON,
 JEAN ELLIOTT.